Nov. 18, 1969  R. C. KRAEPLIN  3,478,853
AUTOMATIC WEAR ADJUSTER FOR FRICTION DEVICE
Filed Jan. 8, 1968
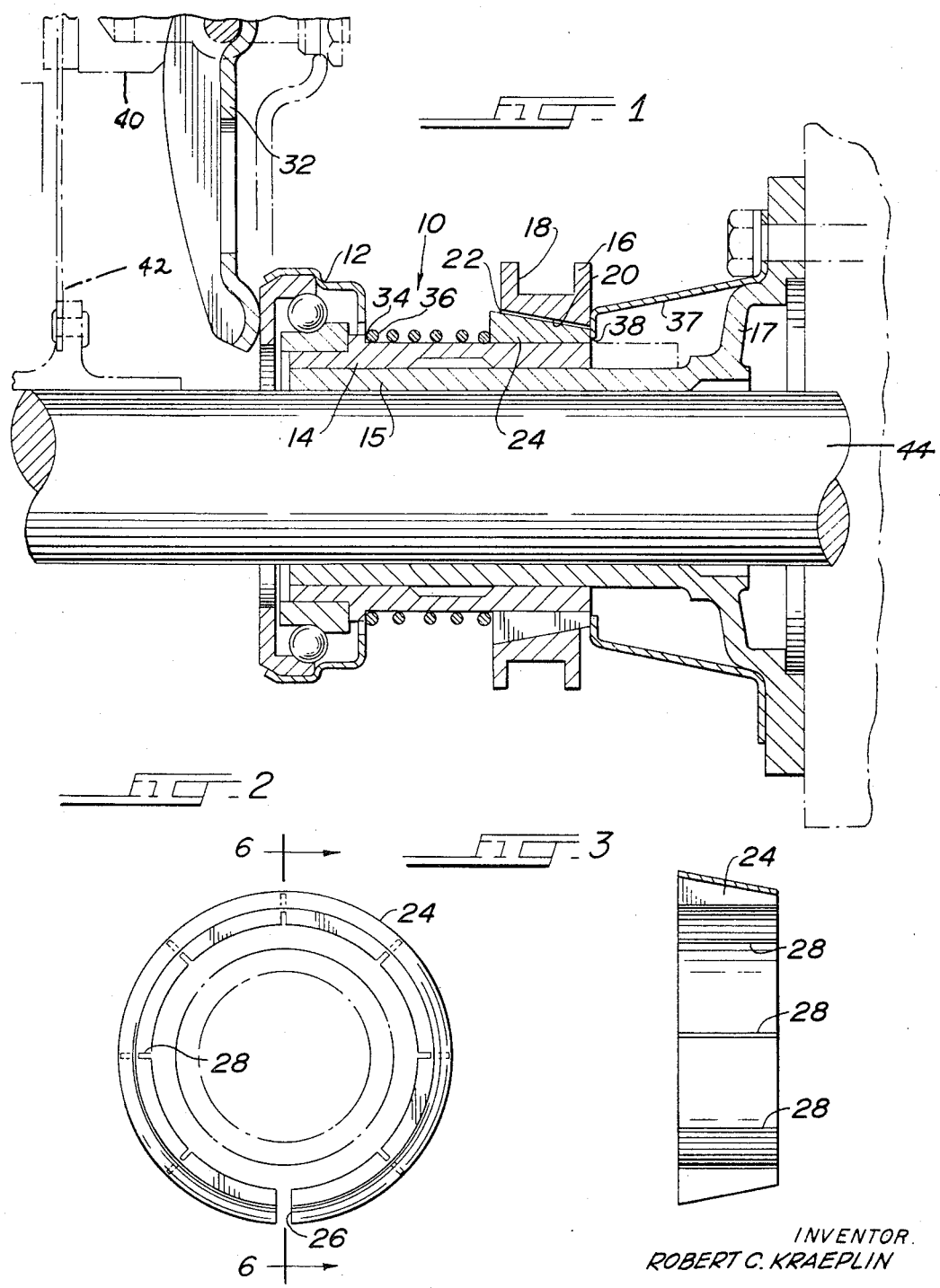
INVENTOR.
ROBERT C. KRAEPLIN
BY John W Butcher

United States Patent Office 3,478,853
Patented Nov. 18, 1969

3,478,853
AUTOMATIC WEAR ADJUSTER FOR FRICTION DEVICE
Robert C. Kraeplin, Beloit, Wis., assignor to Borg-Warner Corporation, Chicago, Ill., a corporation of Delaware
Filed Jan. 8, 1968, Ser. No. 696,388
Int. Cl. F16d *11/04, 11/10, 13/58*
U.S. Cl. 192—111                             4 Claims

ABSTRACT OF THE DISCLOSURE

An adjustment mechanism to compensate for wear of friction facing material in an axially engageable clutch mechanism.

---

This invention relates to automotive clutches and more particularly to an adjustment mechanism for automotive clutches in which the clutch release mechanism is automatically adjusted to compensate for wear at the friction facings.

In automotive clutches of the spring loaded type having a pluarlity of circumferentially spaced pivotally mounted radially extending release levers engageable by an axially movable thrust bearing, the release levers move axially toward the release bearing as facing wear occurs. Backlash or lost motion is normally provided between the levers and release bearing, but if it is not maintained by periodic service adjustments, the levers soon contact the release bearing and a continuous releasing load develops which causes the clutch to slip, overheat, and damage the facings. Also the heat deteriorates the grease in the bearing, causing noise and ultimately a bearing failure.

The principal object of the invention, therefore, is to eliminate the need for periodic service adjustments and provide an improved means effecting automatic adjustment of the release position in response to wear.

In the accompanying drawings:

FIGURE 1 is an elevational sectional view of a clutch operating mechanism made in accordance with present invention and showing the parts in their different positions;

FIGURE 2 is a reduced view illustrating the split ring forming part of the mechanism of FIGURE 1; and FIGURE 3 is a vertical sectional view taken substantially on line 6—6 of FIGURE 2.

Referring now to the drawing and more particularly to FIGURE 1, wherein 44 indicates an output shaft, 40 a driven friction plate assembly and a spring loaded pressure plate, the clutch operating mechanism of the present invention is illustrated by reference numeral 10 and includes a thrust bearing 12 mounted on a carrier sleeve 14 for axial adjustment therewith, a carrier yoke unit 16 includes a sleeve or ring having a peripheral groove 18 for reception of the pintles of an actuating yoke (not shown). The sleeve carrier 14 is mounted for axial adjustment on a stationary sleeve 15 forming a part of a fixed bracket 17. The carrier 16 comprises an internal conical surface 20 which is adapted to engage a complementing external conical peripheral surface 22 of a ring 24 which is illustrated in detail in FIGURES 2 and 3.

The ring 24, as shown clearly in FIGURE 2, is split at 26 and is formed with a plurality of circumferentially spaced radially outwardly extending slots 28. As the yoke carrier 16 is moved axially to the left, as viewed in FIGURE 1 for clutch disengagement, its conical inner periphery 20 engages the outer periphery 22 of the ring 24 and effects a contracting of the ring 24 so that the inner periphery thereof is brought into tight frictional squeezing engagement with the outer periphery of the bearing carrier sleeve 14. The sleeve 14 and the bearing 12 are thus moved into engagement with the inner ends of a plurality of circumferentially spaced radially inwardly extending release levers 32, only one of which is shown. The sleeve 14 is formed with a shoulder 34 against which abuts a helical spring 36, the other end of which abuts against the compressible ring 24 to prevent drift of the ring to the left. The spring 36 urges the ring 24 into abutment with a fixed bracket 37 which has a central opening 38 of sufficient diameter to permit movement of the sleeve 14 therethrough, as illustrated in dot and dash lines in FIGURE 1.

The inner end of release levers 32 tend to move automatically to the right, as viewed in FIGURE 1, as wear occurs on the friction facings. When this movement occurs with wear, the force exerted causes the sleeve 14 to move incrementally to the right after ring 24 engages stop 38, as indicated in dotted lines. In effect, the relative axial distance between the thrust bearing 12 and the carrier yoke 16 is thus reduced with wear. By this arrangement, the yoke is permitted or caused to advance through its customary arc to effect disengagement of the clutch with the same pedal pressure and within sustantially identical time limits or pedal travel throughout the clutch life.

I claim:
1. A self-adjusting clutch having a cover plate adapted to be drivingly connected to an engine, a spring loaded pressure plate, a plurality of circumferentially spaced radially inwardly extending pivotally mounted release levers having inner ends, a driven plate and an output shaft driven by said driven plate, a thrust bearing, a carrier yoke spaced axially from said thrust bearing, said carrier yoke being adapted to be moved axially to urge said thrust bearing into engagement with the inner ends of said release levers to actuate said release levers and cause disengagement between said pressure plate and said driven plate and means including a split ring interposed between said carrier yoke and a sleeve for adjusting the axial distance between said thrust bearing and said carrier yoke so that motion of said carrier yoke away from said release levers is precluded, said split ring having a conical outer peripheral surface, said carrier yoke having a conical inner periphery, and said split ring is compressed by a radial component of an axial force exerted against said carrier yoke and transmitted through said conical surfaces.

2. A clutch in accordance with claim 1 wherein spring means are provided normally to bias said split ring away from said thrust bearing.

3. A clutch in accordance with claim 2 wherein stop means are provided to limit the movement of said split ring away from said thrust bearing.

4. A clutch in accordance with claim 3 wherein means are provided to permit movement of said thrust bearing sleeve towards said carrier yoke in response to movement of the inner ends of said release levers away from said driven plate.

(References on following page)

References Cited

UNITED STATES PATENTS

| | | |
|---|---|---|
| 1,968,274 | 7/1934 | Wemp. |
| 2,002,841 | 5/1935 | Tatter. |
| 2,040,034 | 5/1936 | Tatter. |
| 2,061,093 | 11/1936 | Tatter. |
| 2,808,917 | 8/1957 | Harter. |
| 2,885,049 | 5/1959 | Staadt. |
| 2,996,886 | 8/1961 | Jeffries. |
| 3,202,247 | 8/1965 | Schmidt et al. |
| 3,376,964 | 4/1968 | Root. |

MARTIN P. SCHWADRON, Primary Examiner

L. J. PAYNE, Assistant Examiner

U.S. Cl. X.R.

192—77